(12) United States Patent
Estakhri et al.

(10) Patent No.: US 9,098,440 B2
(45) Date of Patent: *Aug. 4, 2015

(54) SECURE COMPACT FLASH

(71) Applicant: Micron Technology, Inc., Boise, ID (US)

(72) Inventors: Petro Estakhri, Danville, CA (US); Ngon Le, Sunnydale, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/010,593

(22) Filed: Aug. 27, 2013

(65) Prior Publication Data

US 2014/0033328 A1 Jan. 30, 2014

Related U.S. Application Data

(63) Continuation of application No. 12/567,321, filed on Sep. 25, 2009, now Pat. No. 8,533,856, which is a continuation of application No. 11/063,090, filed on Feb. 22, 2005, now Pat. No. 7,607,177.

(60) Provisional application No. 60/547,228, filed on Feb. 23, 2004.

(51) Int. Cl.
| | | |
|---|---|---|
| *G06F 21/00* | (2013.01) |
| *G06F 12/14* | (2006.01) |
| *H04N 5/77* | (2006.01) |
| *H04N 5/907* | (2006.01) |
| *H04N 21/418* | (2011.01) |
| *H04N 21/4223* | (2011.01) |
| *H04N 21/426* | (2011.01) |
| *H04N 21/4367* | (2011.01) |
| *H04N 21/475* | (2011.01) |
| *H04L 9/32* | (2006.01) |

(52) U.S. Cl.
CPC .............. *G06F 12/14* (2013.01); *H04L 9/3226* (2013.01); *H04N 5/772* (2013.01); *H04N 5/907* (2013.01); *H04N 21/4184* (2013.01); *H04N 21/4223* (2013.01); *H04N 21/42684* (2013.01); *H04N 21/4367* (2013.01); *H04N 21/4753* (2013.01)

(58) Field of Classification Search
CPC ... H04N 5/772; H04N 5/907; H04N 21/4184; H04N 21/4223; H04N 21/4367; H04N 21/4753; H04N 21/42684; G06F 12/14; H04L 9/3226
USPC ........... 726/28, 27, 29, 30, 4, 7; 713/183, 184
See application file for complete search history.

(56) References Cited

U.S. PATENT DOCUMENTS

| | | | | |
|---|---|---|---|---|
| 4,920,518 | A | | 4/1990 | Nakamura et al. |
| 5,153,918 | A | * | 10/1992 | Tuai .............................. 713/182 |
| 5,375,243 | A | * | 12/1994 | Parzych et al. ................. 726/17 |
| 5,465,083 | A | * | 11/1995 | Okamoto ..................... 340/5.54 |

(Continued)

*Primary Examiner* — David Garcia Cervetti
(74) *Attorney, Agent, or Firm* — Dicke, Billig & Czaja, PLLC

(57) ABSTRACT

Methods and apparatus are provided, such as a memory card with a processor and nonvolatile memory coupled thereto. The nonvolatile memory has a secure area configured to store a user password and a serial number in encrypted form. The card is configured to grant access to the secure area when the card receives a password that matches the stored user password and the card is coupled to a system having the serial number.

17 Claims, 17 Drawing Sheets

(56) References Cited

U.S. PATENT DOCUMENTS

| | | | |
|---|---|---|---|
| 5,483,596 A * | 1/1996 | Rosenow et al. | 713/167 |
| 5,724,426 A * | 3/1998 | Rosenow et al. | 713/167 |
| 5,774,544 A * | 6/1998 | Lee et al. | 713/189 |
| 5,887,131 A * | 3/1999 | Angelo | 726/20 |
| 5,991,849 A | 11/1999 | Yamada et al. | |
| 6,199,163 B1 * | 3/2001 | Dumas et al. | 713/183 |
| 6,216,230 B1 * | 4/2001 | Rallis et al. | 713/185 |
| 6,257,486 B1 * | 7/2001 | Teicher et al. | 235/380 |
| 6,400,823 B1 * | 6/2002 | Angelo | 380/255 |
| 6,425,084 B1 * | 7/2002 | Rallis et al. | 713/185 |
| 6,427,013 B1 | 7/2002 | Shimizu | |
| 6,463,293 B1 * | 10/2002 | Guyot et al. | 455/466 |
| 6,480,097 B1 * | 11/2002 | Zinsky et al. | 340/5.8 |
| 6,606,707 B1 | 8/2003 | Hirota et al. | |
| 6,609,197 B1 * | 8/2003 | Ketcham et al. | 713/155 |
| 6,836,847 B1 | 12/2004 | Zinger et al. | |
| 6,865,431 B1 | 3/2005 | Hirota et al. | |
| 6,880,054 B2 * | 4/2005 | Cheng et al. | 711/164 |
| 7,039,759 B2 * | 5/2006 | Cheng et al. | 711/115 |
| 7,047,128 B2 | 5/2006 | Dudel et al. | |
| 7,051,128 B2 | 5/2006 | Bando | |
| 7,062,652 B2 | 6/2006 | Hirota et al. | |
| 7,076,666 B2 * | 7/2006 | Unger et al. | 713/189 |
| 7,091,857 B2 * | 8/2006 | Lanigan et al. | 340/545.6 |
| 7,096,370 B1 * | 8/2006 | Klein | 713/193 |
| 7,124,086 B2 | 10/2006 | Okano | |
| 7,174,159 B2 * | 2/2007 | Guirauton et al. | 455/411 |
| 7,205,976 B2 * | 4/2007 | Poo | 345/156 |
| 7,236,877 B2 | 6/2007 | Dudel et al. | |
| 7,358,991 B2 | 4/2008 | Kokubun | |
| 7,359,732 B2 | 4/2008 | Kim et al. | |
| 7,418,602 B2 * | 8/2008 | Yoshida et al. | 713/193 |
| 7,447,915 B2 * | 11/2008 | Tada | 713/193 |
| 7,501,946 B2 * | 3/2009 | Lanigan et al. | 340/545.6 |
| 7,706,666 B2 | 4/2010 | Ando et al. | |
| 7,741,952 B2 * | 6/2010 | Denison et al. | 340/5.73 |
| 7,743,241 B1 * | 6/2010 | Moore | 713/2 |
| 7,873,837 B1 * | 1/2011 | Lee et al. | 713/189 |
| 7,996,911 B2 * | 8/2011 | Yoshida et al. | 726/26 |
| 8,019,696 B2 * | 9/2011 | Harris et al. | 705/401 |
| 8,209,462 B2 * | 6/2012 | Cheng et al. | 711/103 |
| 8,291,240 B2 * | 10/2012 | Emam et al. | 713/193 |
| 2001/0039621 A1 | 11/2001 | Yamamoto et al. | 713/194 |
| 2002/0002503 A1 | 1/2002 | Matsuoka | 705/26 |
| 2002/0010827 A1 * | 1/2002 | Cheng | 711/103 |
| 2002/0018384 A1 | 2/2002 | Sumitani et al. | 365/202 |
| 2002/0024906 A1 * | 2/2002 | Celeste | 369/52.1 |
| 2002/0031225 A1 * | 3/2002 | Hines | 380/247 |
| 2002/0053027 A1 * | 5/2002 | Kim | 713/183 |
| 2002/0072349 A1 * | 6/2002 | Geiselman et al. | 455/411 |
| 2002/0073340 A1 | 6/2002 | Mambakkam et al. | |
| 2002/0095589 A1 | 7/2002 | Keech | |
| 2002/0147989 A1 | 10/2002 | Kessler | |
| 2002/0174287 A1 * | 11/2002 | Cheng | 711/103 |
| 2003/0018587 A1 | 1/2003 | Althoff et al. | |
| 2003/0023337 A1 * | 1/2003 | Godfrey et al. | 700/109 |
| 2003/0026432 A1 * | 2/2003 | Woodward | 380/278 |
| 2003/0026434 A1 | 2/2003 | Naruto et al. | |
| 2003/0039358 A1 * | 2/2003 | Scheidt et al. | 380/47 |
| 2003/0041284 A1 | 2/2003 | Mambakkam et al. | |
| 2003/0080852 A1 * | 5/2003 | Harris | 340/5.54 |
| 2003/0084220 A1 | 5/2003 | Jones et al. | |
| 2003/0084221 A1 | 5/2003 | Jones et al. | |
| 2003/0131114 A1 * | 7/2003 | Scheidt et al. | 709/229 |
| 2003/0167395 A1 | 9/2003 | Chang et al. | |
| 2003/0200179 A1 * | 10/2003 | Kwan | 705/65 |
| 2003/0200406 A1 * | 10/2003 | Kouno | 711/164 |
| 2003/0200411 A1 * | 10/2003 | Maeda et al. | 711/173 |
| 2003/0204732 A1 * | 10/2003 | Audebert et al. | 713/182 |
| 2003/0221103 A1 | 11/2003 | Hirota et al. | |
| 2003/0226030 A1 | 12/2003 | Hurst et al. | |
| 2003/0231102 A1 | 12/2003 | Fisher | |
| 2003/0231249 A1 | 12/2003 | Nakamura | |
| 2004/0005911 A1 * | 1/2004 | Guirauton et al. | 455/558 |
| 2004/0032513 A1 | 2/2004 | Kokubun | |
| 2004/0039708 A1 | 2/2004 | Zhang et al. | |
| 2004/0059937 A1 * | 3/2004 | Nakano | 713/200 |
| 2004/0068601 A1 | 4/2004 | Kang et al. | |
| 2004/0078586 A1 | 4/2004 | Sato et al. | |
| 2004/0103288 A1 * | 5/2004 | Ziv et al. | 713/185 |
| 2004/0117106 A1 * | 6/2004 | Dudel et al. | 701/115 |
| 2004/0119686 A1 * | 6/2004 | Poo | 345/156 |
| 2004/0139255 A1 * | 7/2004 | Cheng | 710/74 |
| 2004/0162932 A1 * | 8/2004 | Mizushima et al. | 711/103 |
| 2004/0179401 A1 * | 9/2004 | Nakata | 365/185.04 |
| 2004/0210758 A1 * | 10/2004 | Jang et al. | 713/185 |
| 2004/0255205 A1 | 12/2004 | Oodate et al. | |
| 2005/0005149 A1 | 1/2005 | Hirota et al. | |
| 2005/0036034 A1 | 2/2005 | Rea et al. | |
| 2005/0058292 A1 * | 3/2005 | Diorio et al. | 380/270 |
| 2005/0086539 A1 | 4/2005 | Dudel et al. | |
| 2005/0179546 A1 * | 8/2005 | Lanigan et al. | 340/545.6 |
| 2005/0185067 A1 * | 8/2005 | Estakhri et al. | 348/231.9 |
| 2005/0192686 A1 | 9/2005 | Hirota et al. | |
| 2005/0216651 A1 | 9/2005 | Tanabiki et al. | |
| 2005/0273648 A1 | 12/2005 | Mambakkam et al. | |
| 2006/0069925 A1 | 3/2006 | Nakai et al. | |
| 2006/0126422 A1 | 6/2006 | Takagi et al. | |
| 2006/0130129 A1 | 6/2006 | Dai et al. | |
| 2006/0200628 A1 * | 9/2006 | Cheng et al. | 711/115 |
| 2006/0230203 A1 | 10/2006 | Cheng et al. | |
| 2006/0236111 A1 | 10/2006 | Bodensjo et al. | |
| 2006/0271792 A1 * | 11/2006 | Devadas et al. | 713/189 |
| 2006/0271793 A1 * | 11/2006 | Devadas et al. | 713/189 |
| 2007/0180177 A1 | 8/2007 | Jones et al. | |
| 2007/0198856 A1 | 8/2007 | Lee et al. | |
| 2007/0288677 A1 | 12/2007 | Mambakkam et al. | |
| 2008/0052453 A1 * | 2/2008 | Cheng | 711/104 |
| 2008/0059660 A1 * | 3/2008 | Cheng | 710/14 |
| 2008/0077802 A1 * | 3/2008 | Richardson et al. | 713/189 |
| 2008/0183978 A1 | 7/2008 | Sohn | |
| 2008/0279382 A1 | 11/2008 | Chen et al. | |

* cited by examiner

SECURE COMPACT FLASH

RELATED APPLICATIONS

This application is a continuation of U.S. patent application Ser. No. 12/567,321, entitled "SECURE COMPACT FLASH," filed on Sep. 25, 2009, now U.S. Pat. No. 8,533,856, which is a continuation of U.S. patent application Ser. No. 11/063,090, entitled "SECURE COMPACT FLASH," filed on Feb. 22, 2005, now U.S. Pat. No. 7,607,177, which application claims the benefit of U.S. Provisional Patent Application No. 60/547,228, filed on Feb. 23, 2004, entitled "SECURE COMPACT FLASH," wherein all of these applications are assigned to the assignee of the present application and the entire contents of all of these applications are incorporated herein by reference.

FIELD

The present disclosure relates generally to electronic devices having security features associated therewith and particularly to digital cards employed in digital cameras or computers with security features deterring unauthorized use thereof.

BACKGROUND

Digital cameras have enjoyed remarkable notoriety, over the past recent years, by a variety of users, such as general electronics consumers, professional photographers and others requiring electronic photograph storage. Some particular areas of growth for the digital camera have been the law enforcement, government and insurance companies. These entities generally require fairly strict security for various reasons in their use of digital cameras.

Digital cameras store images or pictures in electronic form on digital cards. CompactFlash cards are examples of such digital cards operating under the governance of certain standards, as outlined by the Compact Flash Standard. Cards manufactured for digital cameras generally employ nonvolatile or FLASH memory so as to maintain storage of photos even when power is disconnected.

As the need for security has increased tremendously over the last few years, so has the need to increase security vis-a-vis the use of digital cards for digital cameras. Not only is this long-felt need essential for a digital camera, it is also essential for computers and any other electronic device within which a digital card is employed.

In light of the foregoing, it is desirable to develop a secure electronic device, such as a digital camera/card system, to deter unauthorized use of the digital card in unauthorized cameras, computers and/or other such devices.

DETAILED DESCRIPTION

Figure 1:
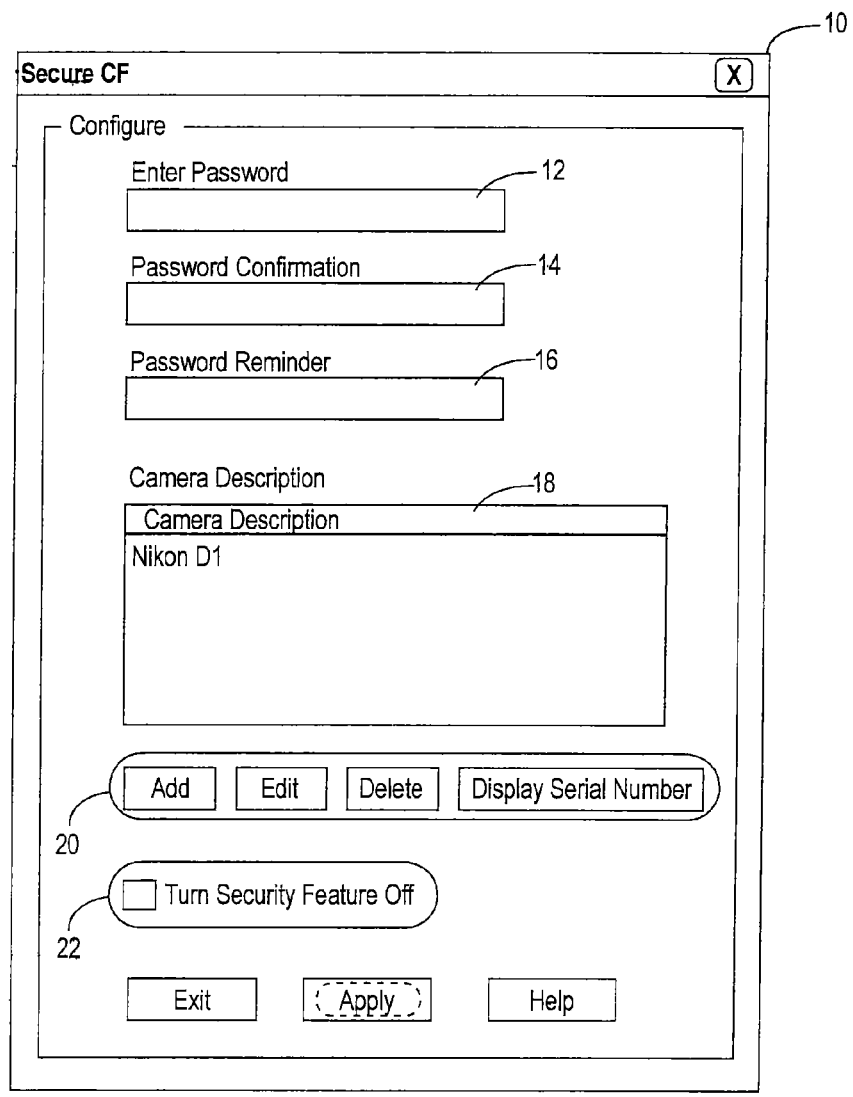
FIG. 1 shows a configuration screen 10 in accordance with an embodiment of the present invention.

Referring now to FIG. 1, a configuration screen 10 is shown, in accordance with an embodiment of the present invention, to include a number of windows, a password window 12, a password confirmation window 14, a password reminder window 16, a camera description window 18 and an editing keypad 20 and a security option selection 22.

In the screen 10, a user of a digital card in a digital camera or computer enters a password of their choosing in the window 12, confirms the same in window 14 and enters a term, in window 16, as a reminder of the user's password in the event the latter is forgotten at a later time. In window 18, a description of the type of camera being employed in entered by the user. In the example presented in FIG. 1, a Nikon D1 is employed although any other digital camera, or in fact, digital device may be employed without departing from the scope and spirit of the present invention.

The editing keypad 20 allows the user the option of adding, editing or deleting a password or camera serial number from the configuration screen. Alternatively, the serial number assigned to the particular camera being employed and the type of camera being employed is displayed in the window 18 as an option to the user, via the keypad 20.

The selection 22 is employed by the user for either turning security feature "on" or "off".

Figure 2:
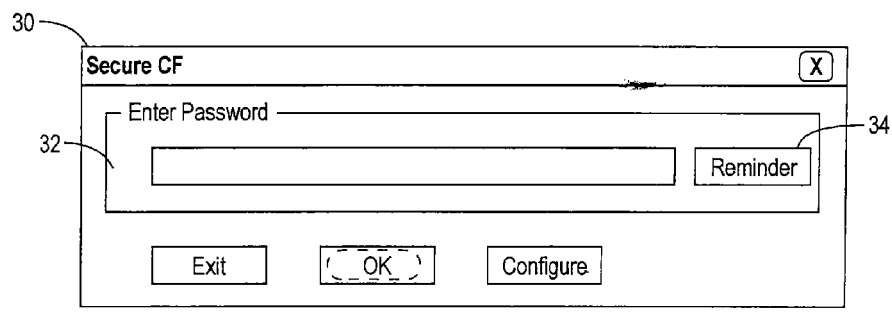
FIG. 2 shows an authentication screen 30 in accordance with an embodiment of the present invention.

FIG. 2 shows an authentication screen 30, in accordance with an embodiment of the present invention, including an "enter password" window 32 and a "reminder" button 34. Using the screen 30, the user enters his/her assigned password, i.e. the password that the user entered in FIG. 1. In the event the user fails to recall his/her password, the reminder button 34 is used to provide hints to the user of terms selected earlier in screen 10 regarding the user's password to aid the user in recalling the user's password.

Figure 3:
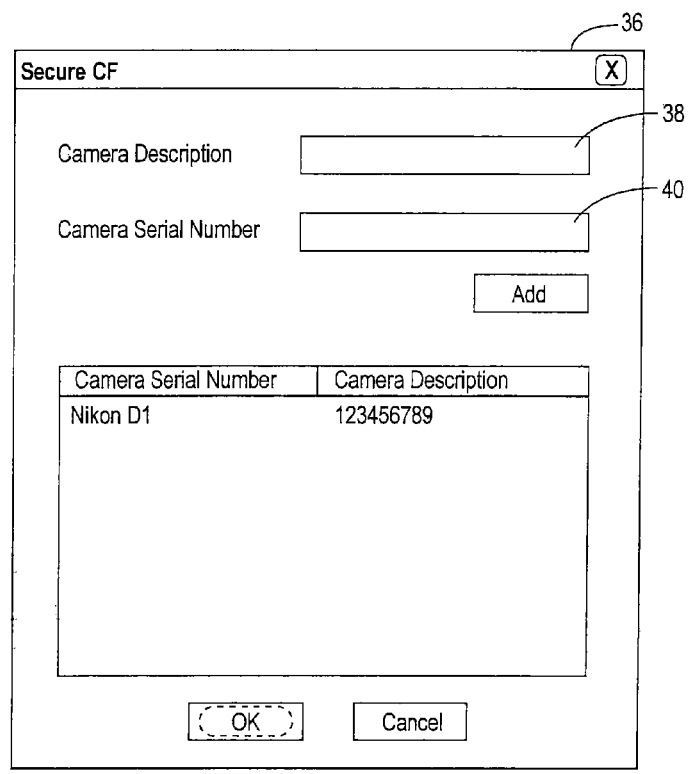
FIG. 3 shows a displaying serial number screen 36, in accordance with an embodiment of the present invention.

FIG. 3 shows a displaying serial number screen 36, in accordance with an embodiment of the present invention, including a camera description window 38 and a camera serial number window 40. A user adds a particular type of digital camera to the window 38 and a serial number that is unique to that particular type of digital camera to the window 40. The serial number is used by the camera and the card that is inserted into the camera to ensure authorized use thereof, as will be explained in further detail below.

In operation, a user first configures a digital card on a personal computer, such as, but not limited to, a PC (using a WinXp/2K operating system) or MAC (using an OS X or higher operating system). The configuration is effectuated by secure compact flash software, which is executed by the digital card, the details of which are described herein with respect to other figures. Execution of the software (or code) causes the screen 10 to be depicted to the user and for the user to provide input thereto as explained above with reference to FIG. 1.

Execution of the software causes encryption of the password that is provided by the user in FIG. 1. Execution of the software additionally causes encryption of the camera serial number, and other information regarding the security features of FIG. 3. Encryption, as used herein, indicates any kind of scrambling that would cause the value or term being encrypted to appear meaningless to a receiver unless successfully descrambled.

Figure 5:
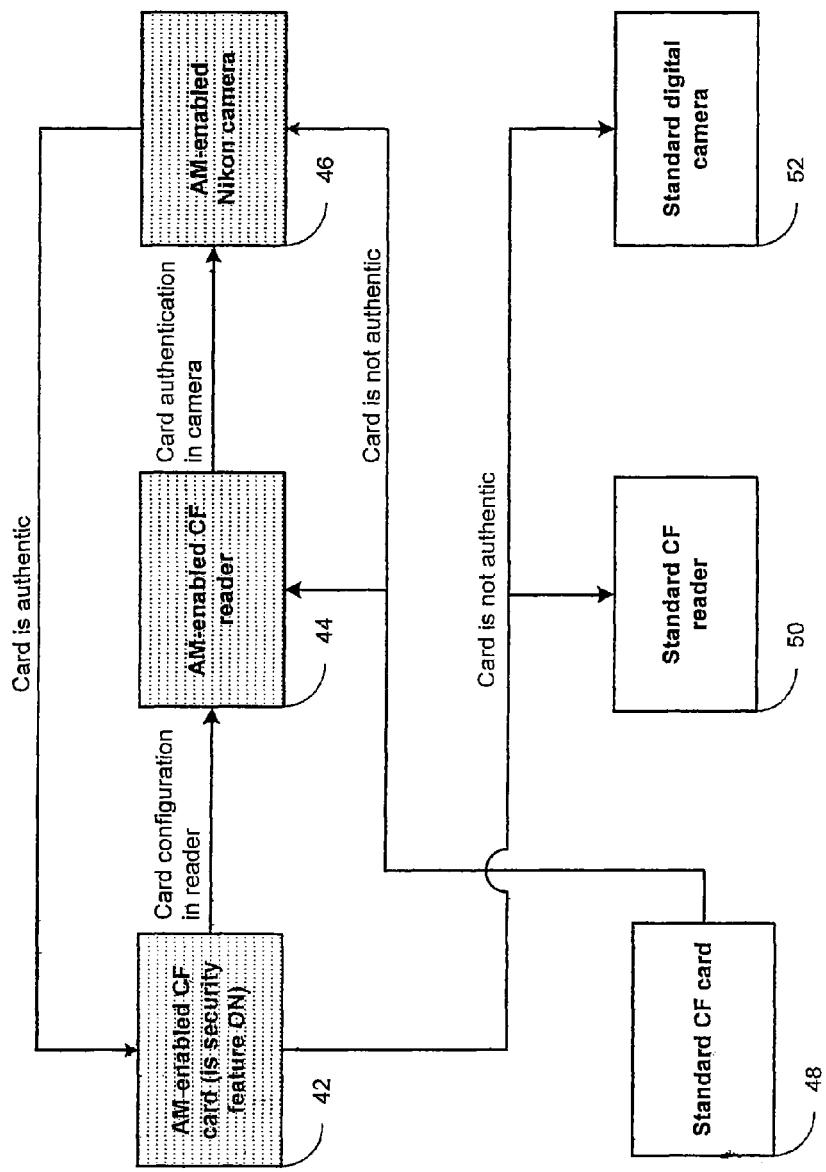
FIG. 5 shows a configuration and authentication of a compact flash card is shown in conceptual form.

Referring back to FIG. 2, a user is requested to enter his/her password for authentication thereof, which is performed generally by the execution of software in a reader coupled between a card and a camera, as shown in FIG. 5.

Figure 4:
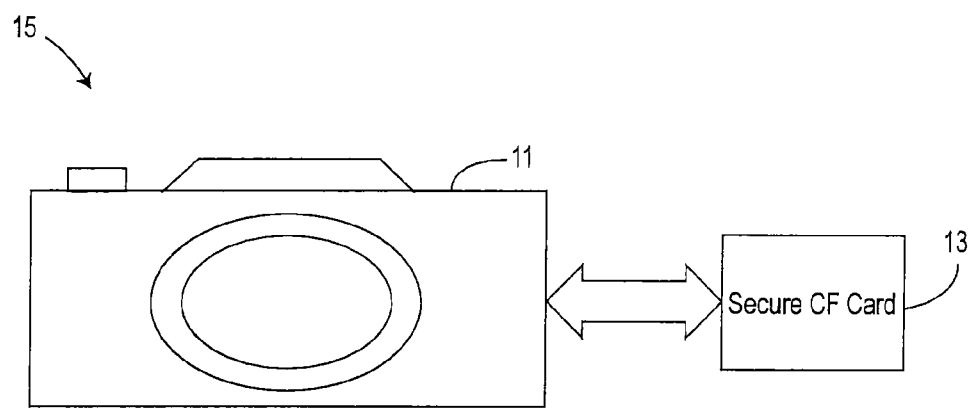
FIG. 4 shows a high-level diagram of a digital camera system 15 including a digital camera 11 connectable to a flash card 13.

Perhaps now, a brief background of a digital camera and digital card is in order. FIG. 4 shows an example of a digital camera system 15 including a digital camera 11 connectable to a flash card 13. The card 13 may be connected to the camera 11 through a universal serial bus (USB) or any other type of connection known in the industry. The card 13 includes nonvolatile memory or flash memory with a capacity to store 512 Mega bytes although other types of cards with alternative capacities may be employed.

The card 13 is designed to operate in accordance with the Compact Flash Standard, generally known to those of ordinary skill in the art, but it can be designed to conform to other types of standards known to those of ordinary skill in the art. The card 13 illustrates an example of the card 14 of FIG. 5 in operation with the camera 11, which is intended as an example of the camera 46 of FIG. 5.

Figure 4A:
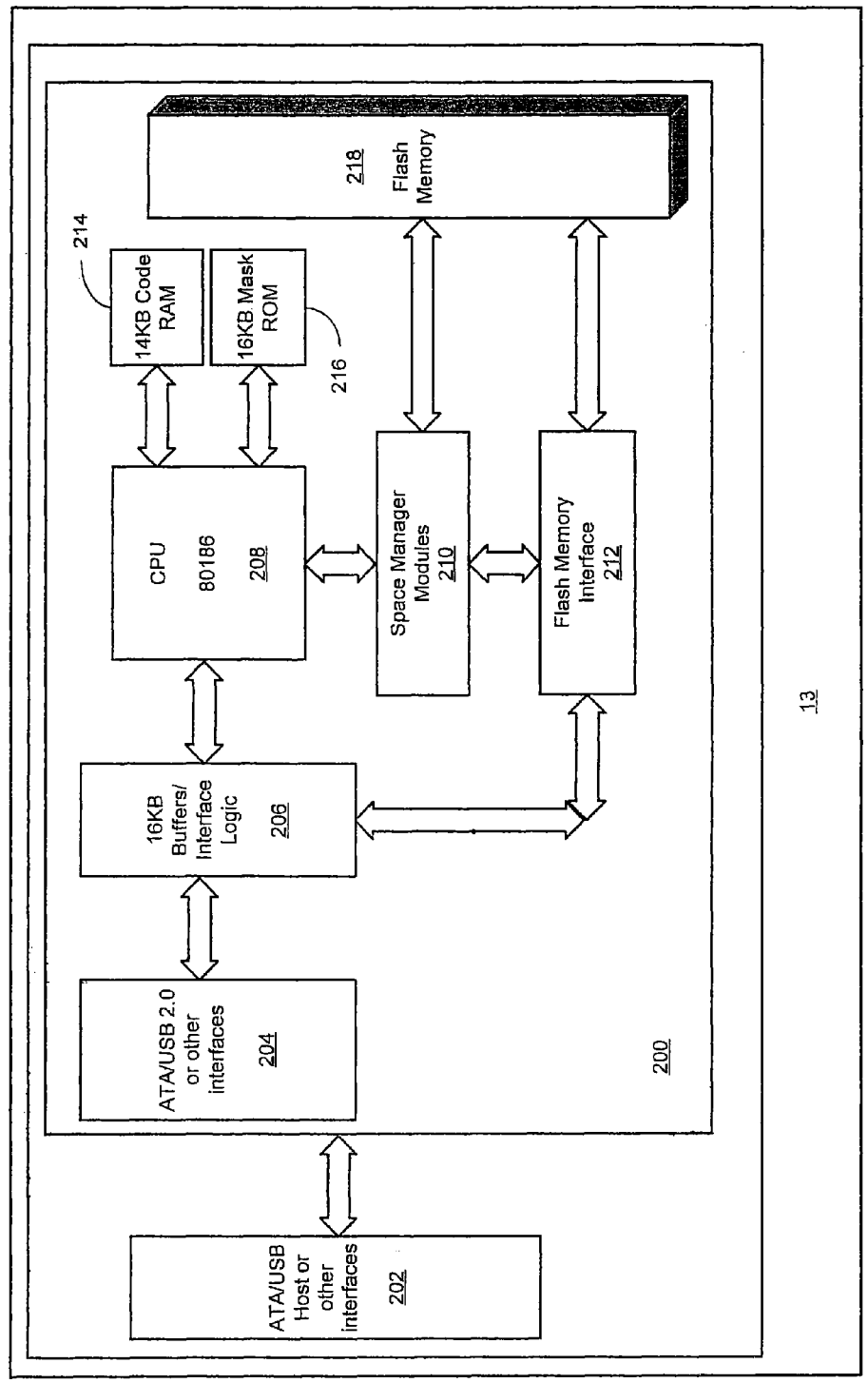
FIG. 4a shows a block diagram of some of the functional blocks within the flash card 13 of FIG. 4.

FIG. 4a shows a block diagram of some of the functional blocks within the flash card 13 of FIG. 4. Specifically, the card 13 is shown to include a controller 200 and a host interface logic 202. The host logic 202 may be in accordance with an Advanced Technology Attachment (ATA) or Universal Serial Bus (USB) standards or any other type of known interface.

The host logic 202 couples the controller 200 to a host, which may or may not be located within a digital camera. The controller 200 is shown to include an ATA/USB interface logic 204 shown coupled to a buffer/interface logic 206, which is, in turn, shown coupled to a Central Processing Unit (CPU) 208 and a flash memory interface logic 212. The CPU is also shown coupled to a space manager module 210 and a Random Access Memory (RAM) and a Read Only Memory 216. The space manager module 210 is shown coupled to flash memory 218.

The interface 204 is ATA/USB, however, as previously noted with respect to the interface 202, this interface may be any type of interface. The logic 206, in the example of FIG. 4a, is 16 Kilo bytes but any other size may be employed. The CPU 208, in the example of FIG. 4a, is of the type 80186, manufactured by Intel, Inc. of Santa Clara, Calif., however, any other type of processor may be similarly employed. The RAM, in this example, is 14 Kilo bytes but can be any size as well. The flash memory 218 includes nonvolatile memory that may be of flash type or otherwise and also includes active memory, such as that discussed throughout this patent document.

In operation, commands for storing or retrieving information to and from the memory 218 are sent and received by a host (not shown), through the interface 202, which is also used to program the active memory with vendor unique commands, such as those presented as examples hereinbelow.

The interface 204 conveys commands between the flash memory 218 and the host via the interface logic 206 where commands are stored and stacked for processing by the CPU. The interface 212 causes coupling between the logic 206 and the flash memory 218. The space manager manages the areas of the flash memory 218 within which information is stored or retrieved by translating addresses received from the host to addresses recognizable by the flash memory 218. The CPU 208 executes commands to mastermind data transfer and manipulation between the flash memory 218 and the host by accessing programs stored within the RAM 214 and the ROM 216. The latter two are merely programmable memory used for storing executable software/firmware for use by the CPU. It should be noted that application software, which is likely to be unique to each vendor, is stored in the active memory of the flash memory 218 rather than the memories 214 and 216, thus, it remains in tact even when the card 13 is formatted or re-formatted. While not shown in FIG. 4a, electronic keys, as discussed throughout this document, are stored in memory buffers, located in the buffer/interface logic 206 of FIG. 4a, which are shown in FIG. 8a.

In FIG. 4a, any of the memories 216 or 218 or both, i.e. some type of storage area, a computer readable medium, for storing software programs are for carrying out the various functions discussed herein. The CPU executes code from the computer readable medium for effectuating the functions discussed herein.

Referring now to FIG. 5, configuration and authentication of a compact flash card is shown in conceptual form. Conceptually, an active memory (AM)-enabled compact flash (CF) card 42, an AM-enabled CF reader 44 and an AM-enabled camera 46, a standard CF card 48, a standard CF reader 50 and a standard digital camera 52 are shown in block and conceptual form. Actually, in FIG. 5, the shaded blocks, i.e. the AM-enabled CF card 42, the AM-enabled CF reader 44 and the AM-enabled camera 46 are shown to indicate that they are all AM-enabled and secured and may be referred to as a nonvolatile memory system. That is, the security option at 22 in FIG. 1 is turned on thereby requiring authentication of a digital camera prior to operation thereof. In an example application, the cards 42 and 48 are each employed for storage of digital images in photography applications, although a wide variety of other applications is contemplated. The card 42 may be any electronic device including memory and particularly, active memory with the active memory being enabled.

Active memory, as referred to herein, is nonvolatile or flash memory that is used for storing firmware or software hidden to or protected from a user and the host, a host being a device for transferring commands to the flash memory through a controller. An example of a controller is provided with respect to FIG. 4a. It should be noted that during formatting of the flash memory, the active memory, at times referred to as protected memory, is not affected, i.e. its contents remain in tact and are not deleted or modified.

Secure cards are specifically designed not to function in unauthorized cameras or on computers without the correct software, readers and password, as demonstrated in conceptual form in FIG. 5.

In FIG. 5, when an active memory (AM)-enabled compact flash (CF) (or nonvolatile) memory card 42 is inserted into or coupled to the AM-enabled CF reader 44, the card configuration is read by the reader 44. The reader 44 is coupled to the camera 46 for authentication of the card 42. The camera 46 may be any digital electronic device. The card 42 and the reader 44 may each physically be located within or externally to the camera 46. The steps performed for configuration and authentication of the card 42 will be described shortly with respect to further figures. For now, suffice it to say that if, in fact, the card 42 is a secure card and the reader 44 and the camera 46 are also secure, once the card 42 is inserted into the reader 44, it is configured by the latter and then authenticated by the camera 46 through the reader 44. In other applications, the camera 46 may be any digital system, such as a computer, in which a memory card is inserted or used.

However, if the card 48, which is a standard rather than a secure card, is in communication with the reader 44, it is not configured by the reader 44 nor is it authenticated by the camera 46. Similarly, if the card 42 is coupled to the reader 50, even though it is secure, it is not configured or authenticated because the reader 50 is not secure nor is the camera 52.

Figure 6:
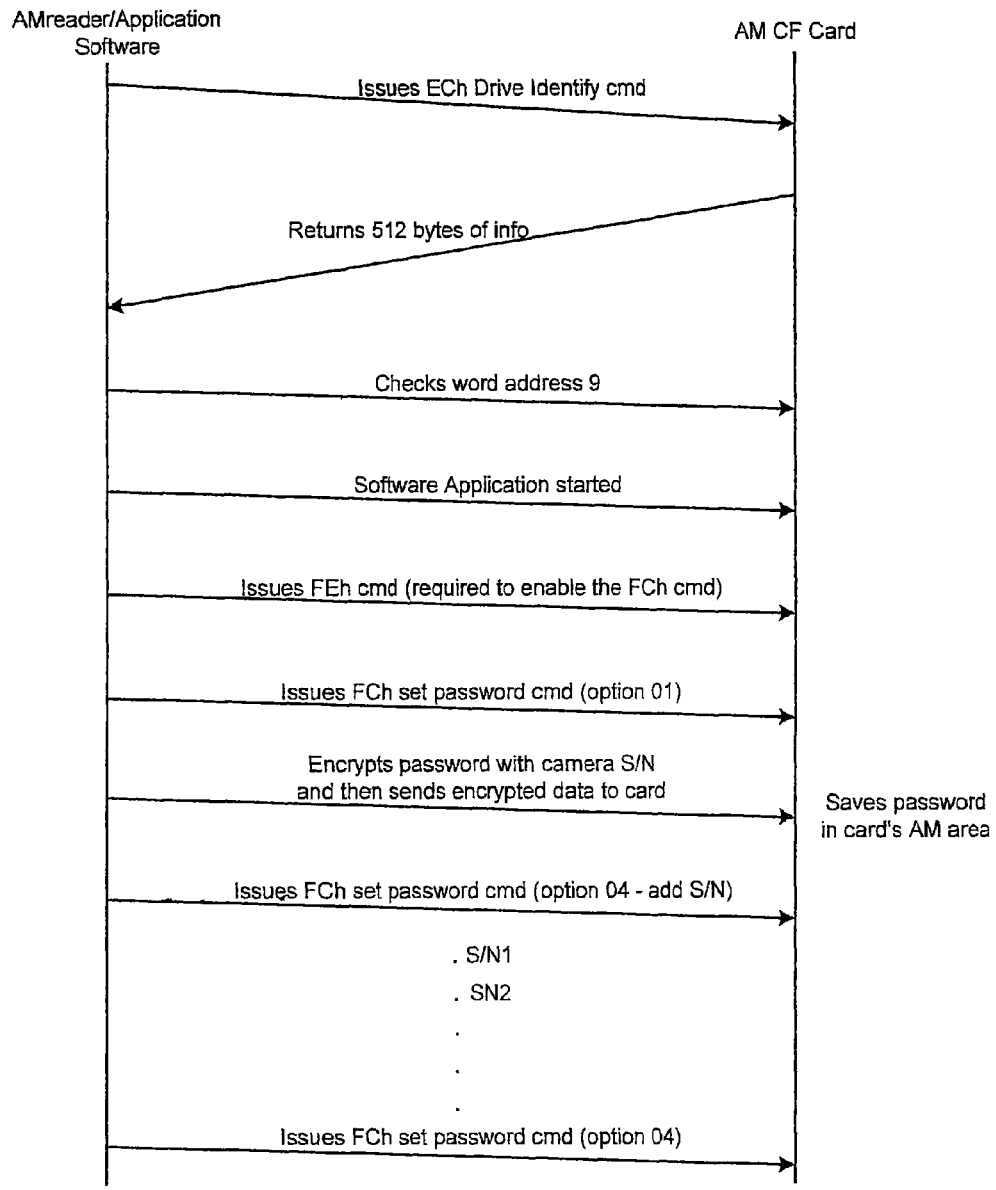
FIG. 6 illustrates conceptually the command flow for configuring a secure AM-enabled card that is coupled to a secure reader, such as the card 42 and the reader 44 of FIG. 5.

FIG. 6 shows, conceptually, the command flow for configuring a secure AM-enabled card that is coupled to a secure reader, such as the card 42 and the reader 44 of FIG. 5. First, the reader (or application software) 44 issues a command, such as EC, in hexadecimal notation, and referred to as Identify Drive Command to the card 42. Upon receiving this command, the card 42 returns 512 bytes of parameter information to the reader 44. However, one extra field is also returned if in fact, the card 42 is a secure card and this field is later used by the reader 44 to determine the status of the card as that being a secure card or not. The reader 44 then checks an address within the nonvolatile memory of the card 42, identified by the value "9", and upon detecting the value of address "9", expected by the reader 44, the reader 44 initiates a software application that is located on the host computer for execution thereof to control the card 42. The reader 44 further issues a command, identified by the hexadecimal notation FE, to the card 42 and further issues another command, identified by the hexadecimal notation FC, to the card 42. The address identified by the value "9" is commonly known to be in the Identify Drive information.

First, the user enters the password and the serial number of the camera 46 (the camera in which the user wishes the card to operate). The user may enter more than one camera serial number. Then, the reader 44 encrypts or scrambles the password as well as the camera serial number(s) and sends the encrypted or scrambled data to the card 42. The encrypted or scrambled data is stored in the card 42's active memory area. Encryption or scrambling is performed in accordance with known encryption schemes, such as that defined by the American Encryption Standard (AES) or Sha. In another embodiment of the present invention, encryption of the password or any other information referred to herein as being scrambled, such as the camera's serial number need not be encrypted and is accordingly stored in its raw form.

Figure 7:
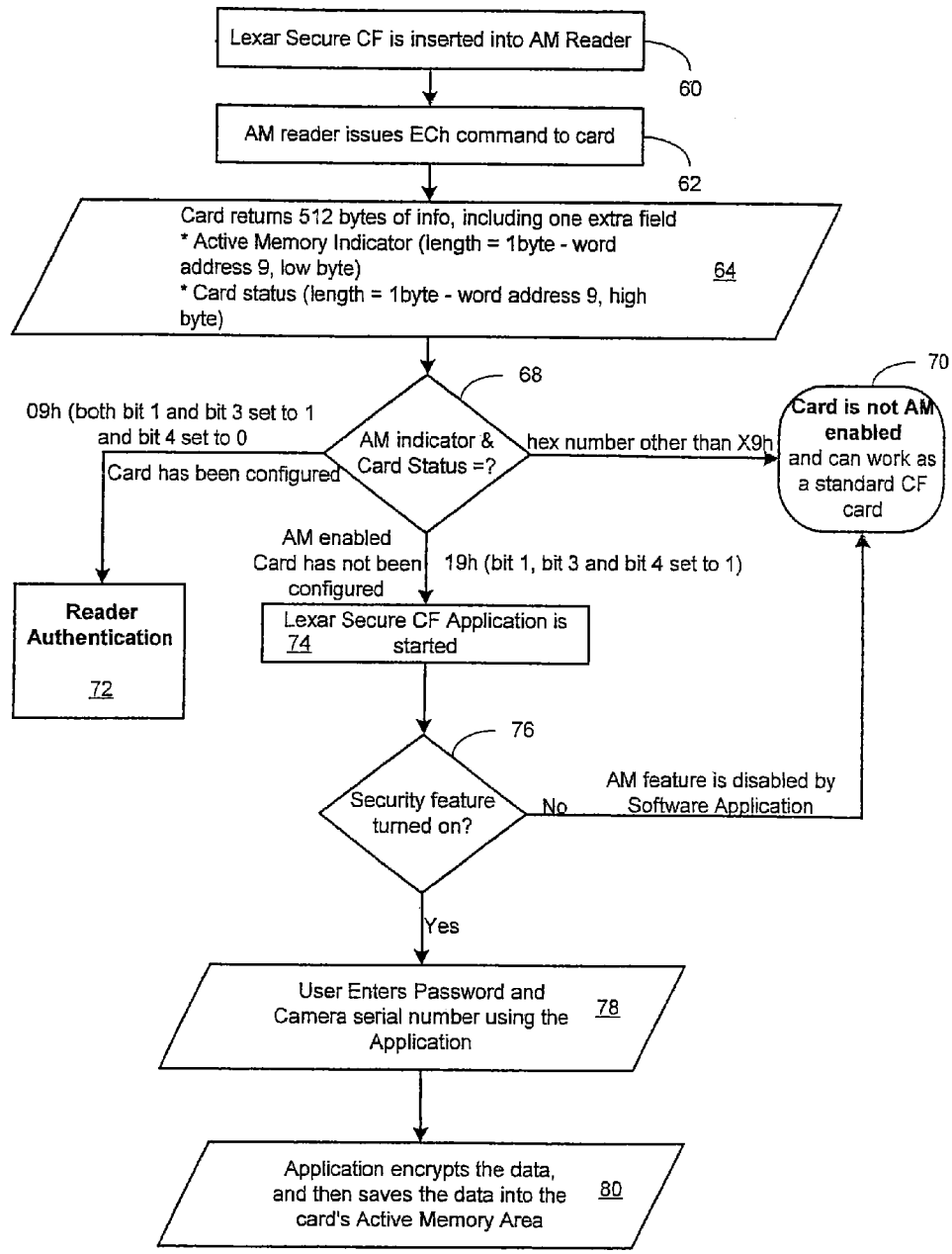
FIG. 7 shows the steps for configuring the card 42 in flowchart form.

FIG. 7 shows the steps for configuring the card 42, in flowchart form. Some of these steps are repeated from those described with respect to FIG. 6. In FIG. 7, at step 60, the card 42 is inserted into the reader 44 of FIG. 5. Next, at step 62, the reader 44 issues an EC command to the card 42, as mentioned hereinabove with respect to FIG. 6. Next, at step 64, the card 42 returns 512 bytes of information to the reader 44 with one extra field of information. The extra field of information pertains to address "9" although this extra field may be identified by any other address. The lower byte of address "9" is an active memory indicator and the higher byte of address "9" is the card's status.

The information included at address 9 is interesting, as the lower byte of this address is an active memory indicator, i.e. whether the card is a secure card or not, and the upper or higher byte of this address indicates card status. Card status is indicative of whether the card 42 has been previously programmed or whether this is the first time it is being programmed.

Next, at 68, the active card indicator and card status are checked by the reader 44 and if the expected values are not detected as being present, the card 42 is determined to be other than a secure card and is declared to operate as a standard card, such as the card 48 in FIG. 5, as shown at step 70 and the card 42 can be used with any standard reader.

However, if at 68, the values checked are those that are expected and the card 42 is determined to have been configured, the process continues to step 72 where authentication of the card begins. In the example of FIG. 7, the expected values are "0" and "5" or "05" in hexadecimal notation, however, other values or methods can be employed without departing from the spirit and scope of the present invention.

Yet another scenario is if the conditions at 68 are met but the card is determined not to have been configured, then the process continues to step 74 where a secure application software is started. Next, at 76, the security indicator is checked, this relates to the way in which 22 of FIG. 1 was set by the user. If at 76, it is determined that the security feature is on, the process continues to step 78, however, if it is determined that the security feature is not on, the process goes back to the step 70 where the card 42 is treated as a standard card.

At step 78, the user enters a password and a serial number of the camera in which the card is to be used, such as discussed with reference to FIGS. 1-3. Next, at 80, the reader 44 encrypts or scrambles the information entered by the user, i.e. the password and serial number, and then saves the encrypted information into the card's active memory area. It should be noted at this time that the active memory area is a protected area within the nonvolatile memory of the card 42 and therefore directly inaccessible to the user and to which access is typically only granted to and by a secure reader with the use of application software, which is itself secure.

Figure 8:
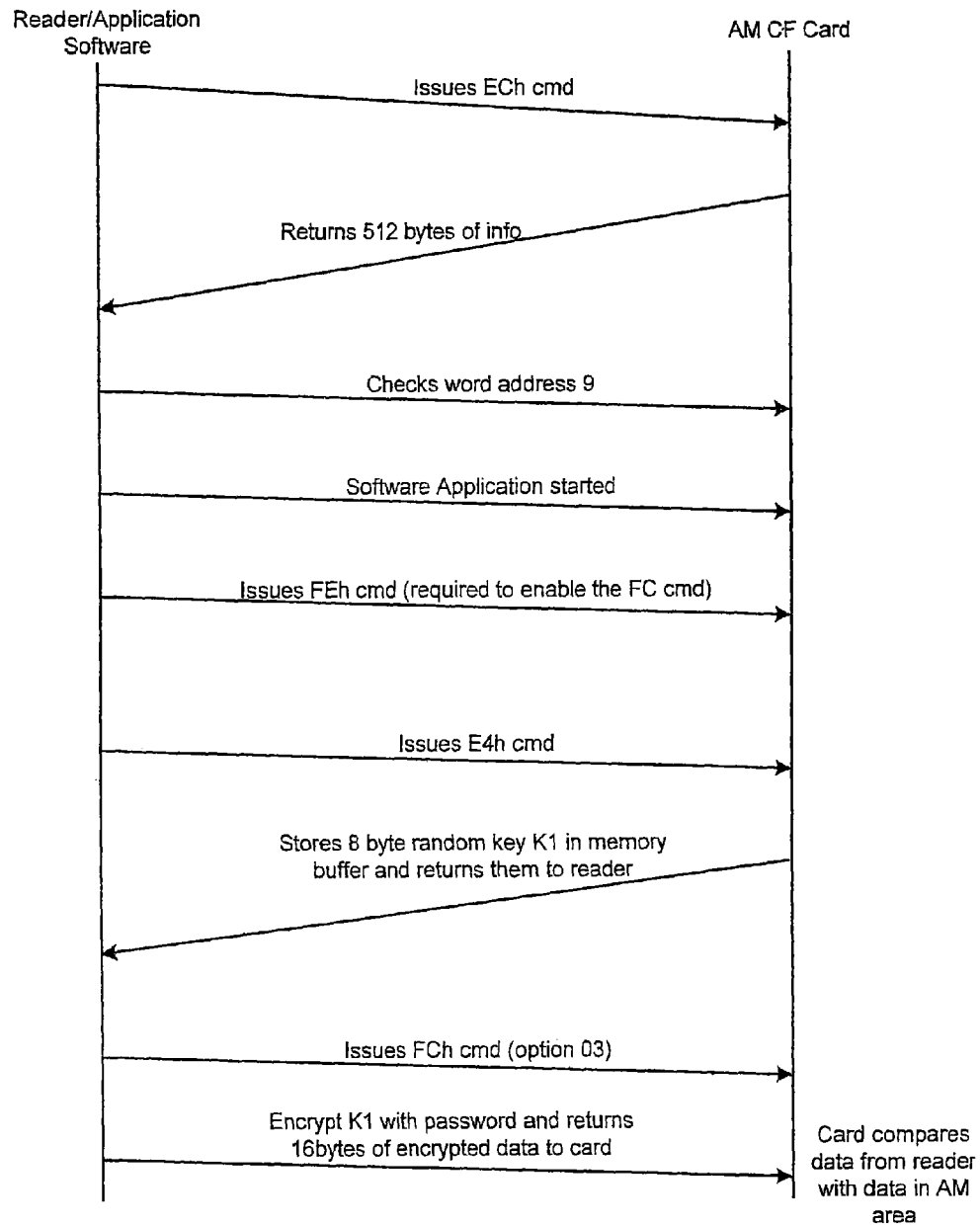
FIG. 8 shows, in conceptual form, the authentication command flow by a reader, such as the reader 44 of FIG. 5, for authenticating the card 42.
Figure 8A:
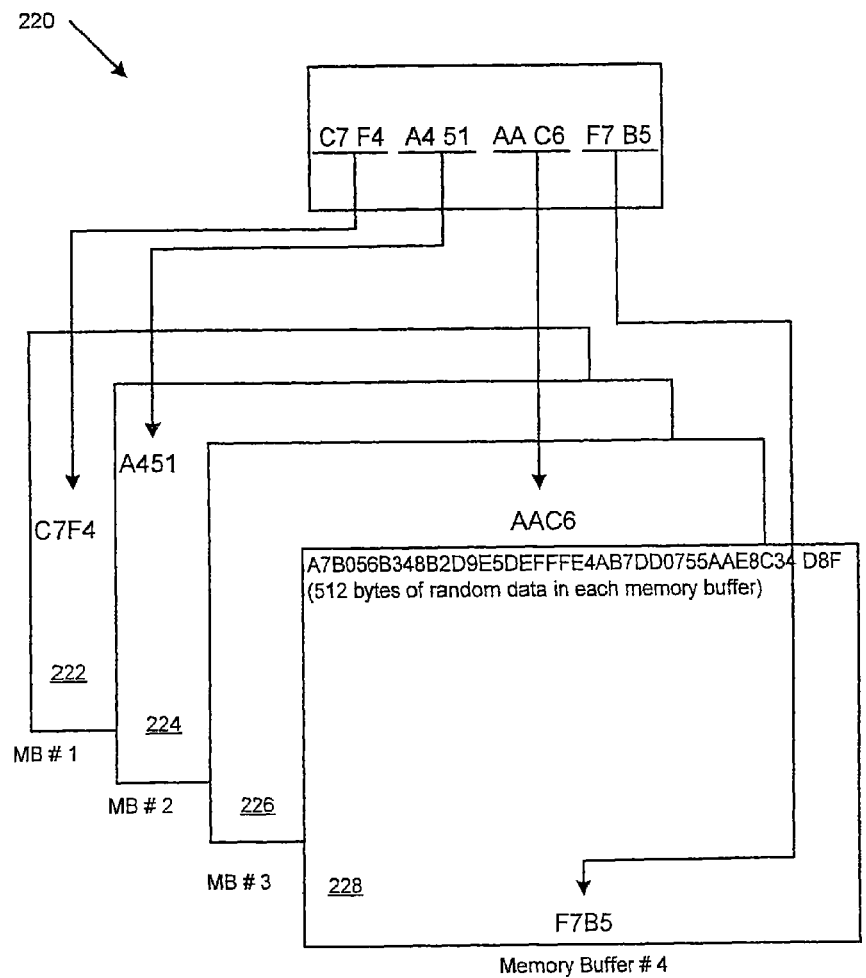
FIG. 8a shows a memory buffer module 220 in accordance with an embodiment of the present invention.

FIG. 8 shows, in conceptual form, the authentication command flow by a reader, such as the reader 44 of FIG. 5, for authenticating the card 42. The reader 44 issues an Identify Drive Command, EC, to the card 42, as that described hereinabove. The reader 44 receives 512 bytes of parameter information from the card 42 but if the card 42 is a secure card, an extra field is provided to the reader 44, which indicates card type and card status. As explained above, this information is included within a predetermined address location, such as address "9". The card type indicates whether the card 42 is active memory enabled or secure and the card status indicates whether the card 42 is being programmed for the first time or not.

The reader 44 reads the information in the extra field, provided by the card 42, to identify the card. If it is determined that the card is not an active memory enabled card or a secure card, the reader 44 operates as a standard, non-secure, reader. The reader 44 reads an AM enable/disable bit in the card's active memory area. When configuring the card in the reader, the user has an option to either turn the security feature on or off, as previously discussed. The default setting for the security option is generally "off" although, alternatively, it may be "on" and the card operates as a standard card, capable of being used in any reader.

The reader 44 issues a read buffer command, identified as "E4" in hexadecimal notation, to the card 42. The card 42 returns 8 bytes of random key. A key is a value, transferred in electronic form and uniquely assigned per each operation. The 8-byte random key is stored in a predetermined area or location within memory. The key need not be 8 bytes, 8 bytes is merely used as an example.

The reader 44 issues a command identified by "EF" in hexadecimal notation to return the following information to the card 42: 16 bytes of encrypted data including a password, a camera serial number and 8 bytes of random key, although, the key need not be 8 bytes. Upon receiving this encrypted information, the card 42 performs three tasks, it: Receives 16 bytes of encrypted or scrambled data from the reader 44 and then decrypts it using an encoding/decoding scheme (the encoding/decoding scheme may be any known schemes), the decrypted data is referred to as "data 1"; Retrieves encrypted or scrambled data from the AM area and the latter is referred to as "data 2"; and Compares "data 1" to "data 2". If the compared data is a match, the card is declared authentic, whereas, a mismatch indicates the user has entered an erroneous password.

FIG. 8a shows a memory buffer module 220 located within the logic 206 of FIG. 4a. The module 220 is shown to include four memory buffers, 222-228 for storing segments of a key. An example is presented with respect to FIG. 8a to include storage of an electronic key that is 8 bytes in length and random in nature. A key need not be 8 bytes and can rather be any number of bytes in length but it is preferable that it be random, in nature, to enhance security features.

The key of the example in FIG. 8a is shown to be "C7F4A451AAC6F7B5" in hexadecimal notation and every two bytes are intentionally stored in a different memory buffer. For example, the first byte "C7F4" of the key is stored in memory buffer 222, the second byte of the key "A451" is stored in memory buffer 224, the third byte AAC6 is stored in memory buffer 226 and the fourth byte, "F7B5", is stored in memory buffer 228. Spreading the storage of the key to various memory buffers makes it further difficult for an undesirable intruder to disturb the system and to retrieve the key, which would potentially jeopardize vendor-confidential information.

It should be noted that while the key, in the example of FIG. 8a, is shown to be stored within four memory buffers, it might be stored in even more or less memory buffers. Clearly, the more memory buffers used to store segments of pieces of the key, the stronger the security precautions.

Each of the memory buffers 222-228 includes 512 bytes of storage locations although a larger or smaller buffer size may be employed. It should also be noted that as an added measure of security, the key may be dynamic in that every piece thereof or any portion of the pieces may be placed in a different location within the buffers 222-228. A scrambling scheme, one known in the art, is used to scatter the key or pieces thereof throughout the memory buffers 222-228. In fact, the location of the key is preferably only known to the camera with which the key is intended to operate. Furthermore, the contents of the buffers 222-228 is dynamic.

Figure 9I:
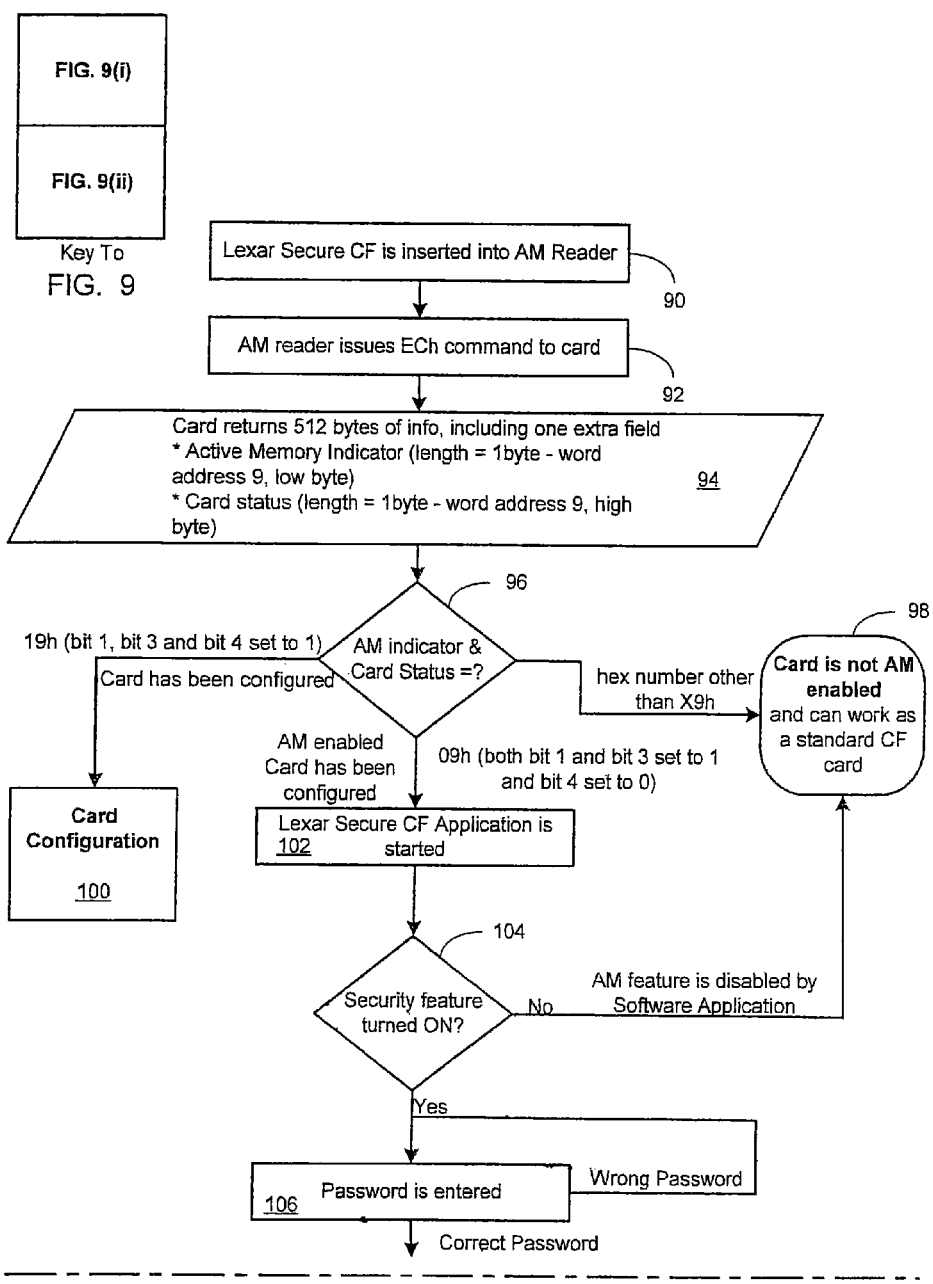
FIG. 9(i) illustrates a flow chart of the steps processed by the reader 44 of FIG. 5 in authenticating the card 42 of FIG. 5.
Figure 9:
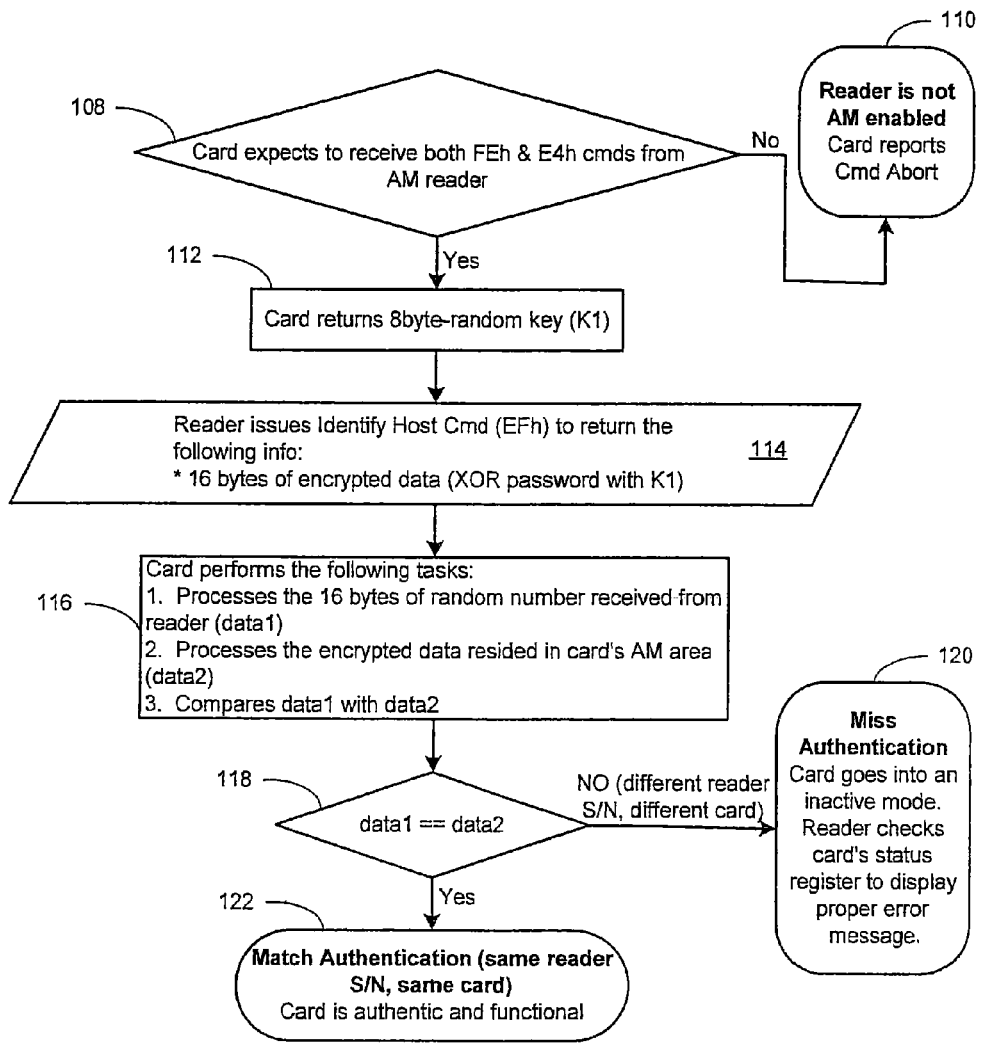
FIG. 9(ii) illustrates a continuation of the flow chart of FIG. 9(i) of the steps processed by the reader 44 of FIG. 5 in authenticating the card 42 of FIG. 5.

FIG. 9 illustrates, in flow chart form, the steps processed by the reader 44 of FIG. 5 in authenticating the card 42 of FIG. 5. At step 90, the card 42 is inserted into the reader 44. Next at step 92, the reader issues an EC command to the card 42, as explained hereinabove. Next, at step 94, the card 42 returns, to the reader 44, 512 bytes of information including an extra field, which as explained earlier, is an active memory indicator and card status. That is, at a predetermined address, such as an address in the card's memory identified by the value "9", and at its low byte, an active memory indicator is indicated and at its higher byte, the card's status is indicated.

Next, at 96, a determination is made as to whether or not an active memory indicator is set and the status of the card is determined based on the information returned at step 94. If it is determined that the active memory indicator is other than expected, the next step is step 98 wherein the card 42 is not AM-enabled or declared secure and operates thereafter as a standard card. However, if at 96, it is determined that the card 42 is AM-enabled but the card type indicates that it has not been configured, the process continues to step 100 wherein the card is configured. Yet another scenario is if at 96, it is determined that the card status indicates configuration of the card and the card is determined to be an AM-enabled card, the process continues to step 102 at which time the secure application in the reader 44 is started.

Next, at 104, the security feature, programmed by the user, is checked and if it is determined not to have been turned on, the process goes back to step 98 where the card is noted to operate as a standard card. However, if the security feature is determined to have been turned on, the process continues to step 106 at which time a password is entered by the user, as described with respect to FIGS. 1-3. In the event an incorrect password is entered, the process stays at step 106 until a correct password is noted. Once a correct password is noted, the card 42 expects to receive, at step 108, a couple of predetermined commands, such as FE and E4 commands from the reader 44. If such commands are not detected by the card 42, the reader 44 is not AM enabled or secured and the card 42 reports command abort.

However, if at 108, the expected commands were received, the process continues to step 112 at which time the card 42 returns an 8-byte random key to the reader 44. Next, at step 114, the reader 44 issues an Identify Host Command (EF) to the camera 46. The camera 46 returns the following information: 16 bytes of encrypted data (16 bytes of encrypted data is merely an example, the size of the encrypted data is flexible). Next, at 116, the card 42 performs the tasks of: Processing the 16 bytes of random key received from the reader 44; Processing the encrypted data, which has been stored in the card 42's AM area; and Comparing the received key and the stored key.

Next, at 118, if it is determined that the stored key and received key do not match, the card 42 goes into an inactive mode and the reader 44 checks the card's status register to display a proper error message. On the other hand, if there is a match between the stored key and the received key, at step 122, the card is authentic and functional as the right reader, the right serial number and the right card are detected.

Figure 10:
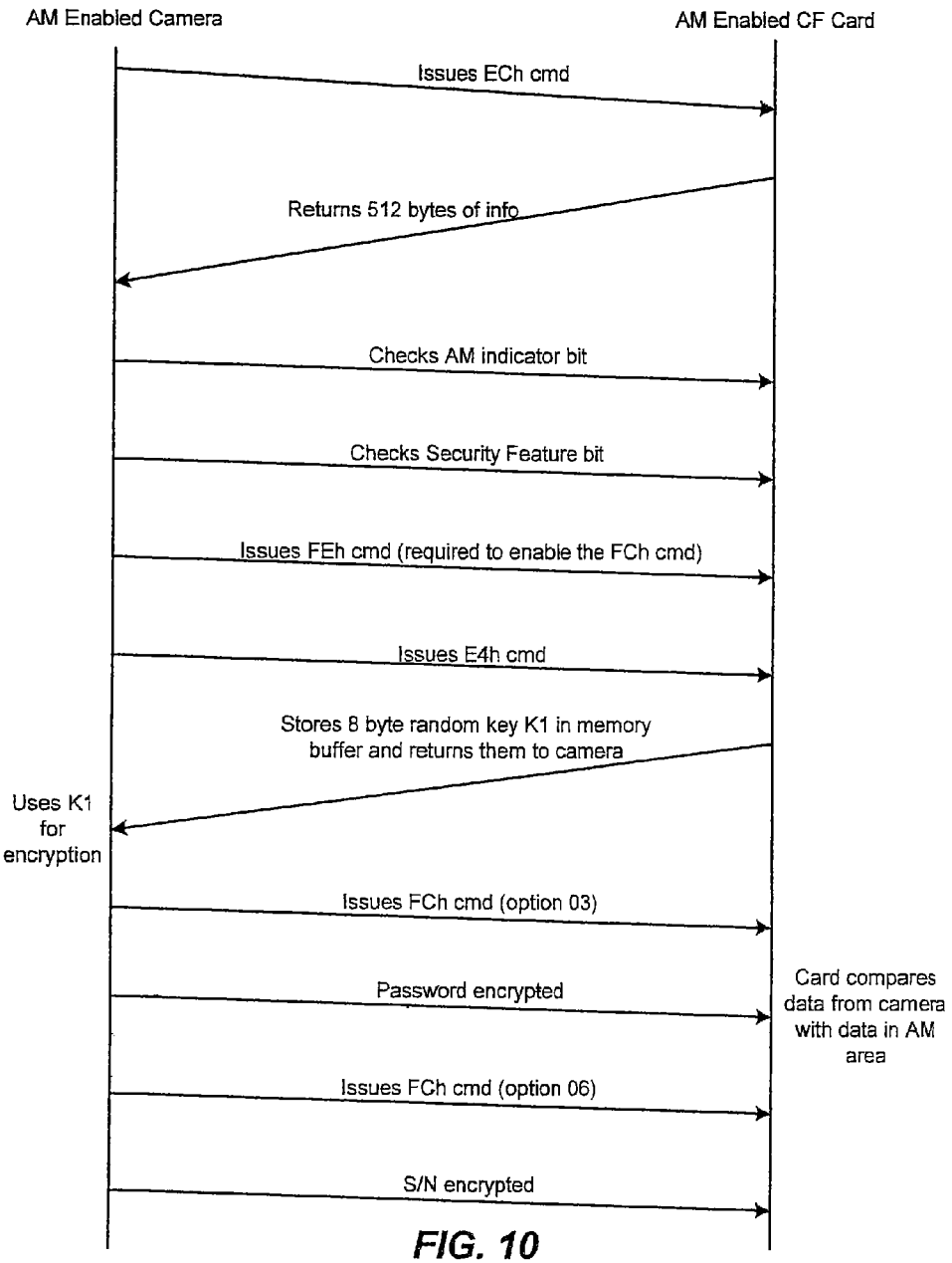
FIG. 10 shows the command flow for an authentication process in accordance with an embodiment of the present invention.

There are two levels of security, i.e. level 1 and level 2, optionally employed with digital cameras and cards pursuant to embodiments of the present invention. FIG. 10 shows the command flow for an authentication process, by the software being executed in a reader, such as the reader 44 with the card 42, employing level I security, in conceptual form.

First, a camera, such as the camera 46, issues an Identify Drive Command to the card 42. This command has the same protocol as the read sector command within the context of disk drives. This command enables the camera to receive 512 bytes of information. Next, the camera 46 checks an AM indicator bit and also checks a security feature bit. This is followed by an E4 command from the camera 46 to the card 42. The card 42 then stores an 8-byte (a byte being 8 bits)

random key, K1, in its memory buffer and returns the same to the camera 46. This random key is an electronic random number generated, electronically, by a random number generator and uniquely assigned to the camera 46 so that authentication is further secured.

Next, an EF command is issued by the camera 46 to the card 42 and the K1 key is encrypted with a password and a 16-byte encrypted data is returned to the card 42 as a result. The card 42 compares data received from the camera, i.e. the 16-byte encrypted data, with the data in its AM area to determine if the camera and card are authentic.

Figure 11I:
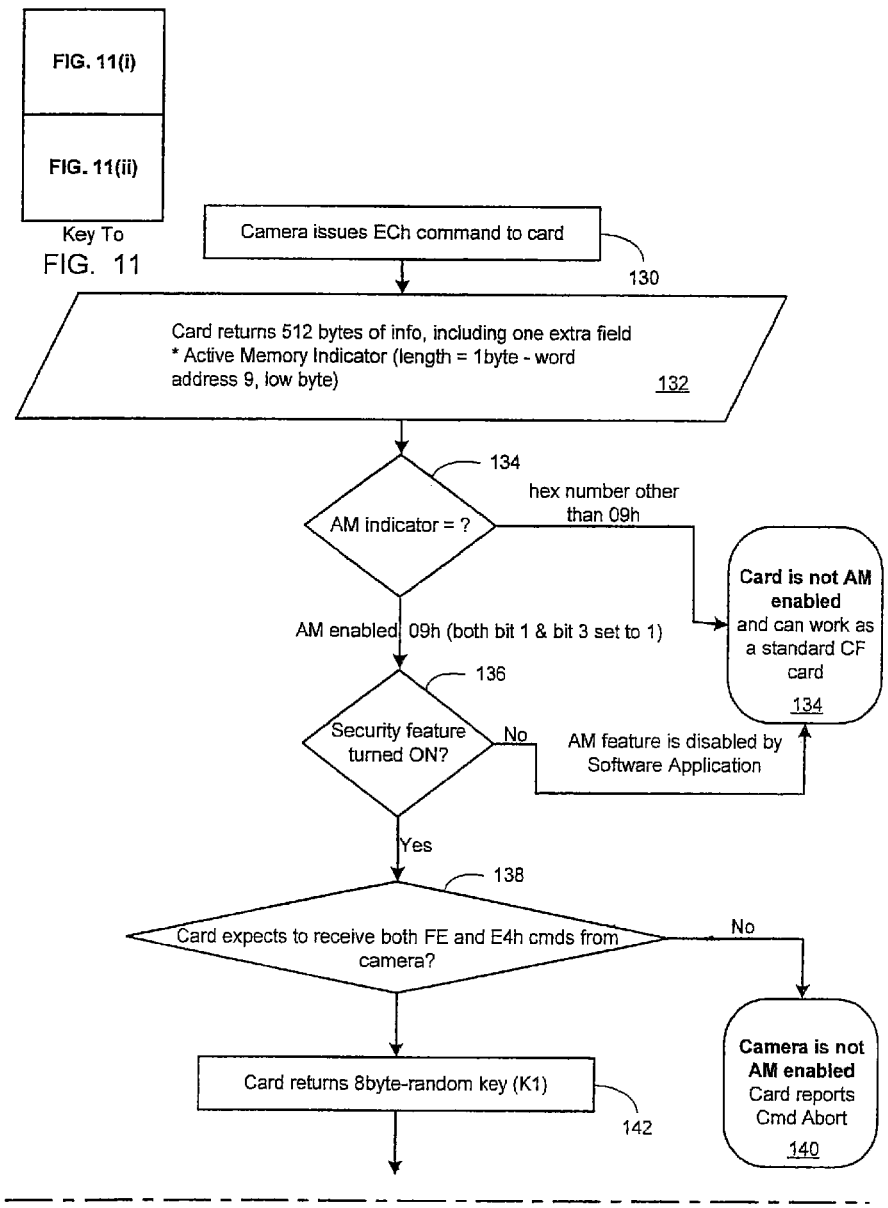
FIG. 11(i) is a flow chart that shows the steps performed for level 1 authentication.
Figure 11:
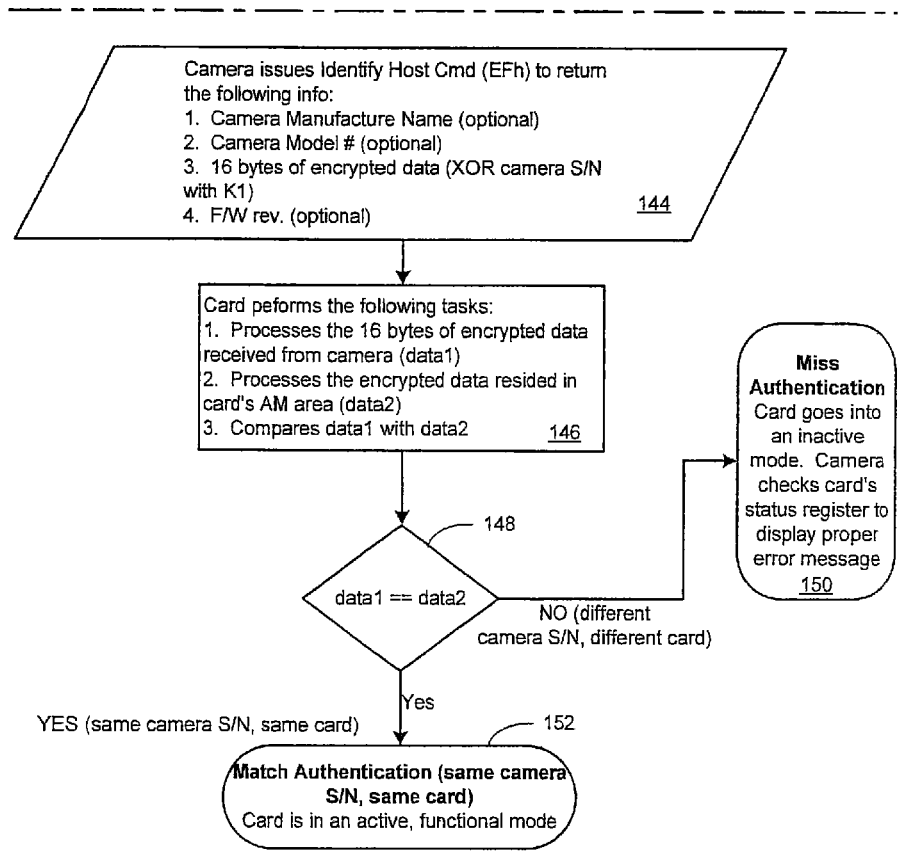
FIG. 11(ii) is a continuation of the flow chart of FIG. 11(i) that shows the steps performed for level 1 authentication.

Similarly, the steps performed for level 1 authentication are presented in flow chart form in FIG. 11. At step 130, in FIG. 11, the camera 46 issues an EC command to the card 42, the EC command is similar to that discussed above. Next, at step 132, the card 42 returns 512 bytes of information, including one extra field. The extra field is an active memory indicator having a one-byte length and addressed at location 9, lower byte, as discussed herein earlier. Next, at 134, the AM indicator is checked to determine if it is a value other than that which is expected, in this example, the value 9 in hexadecimal notation. If the value 9 is noted as the indicator, the process continues to 136, otherwise, the card is declared as not being AM enabled at step 134 and can word as a standard CF card.

At 136, the security feature, which was previously programmed by the user, is check and if it is determined to be "on", the process continues to 138, otherwise, the card is declared as being not AM enabled at step 134 and its AM feature is disabled.

At 138, the card 42 checks for receipt of the FE and E4 commands from the camera 46. If these commands are not detected by the card 42, the camera 46 is not AM-enabled and the card 42 reports a command abort problem to the camera 46, otherwise, the card 42 returns an 8-byte random key, K1, to the camera. Next, at step 144, the camera issues an Identify Host Command (EF) including the following information therein: Camera manufacture name; Camera Model Number, 16 bytes of Encrypted Data; and Firmware Version. The camera manufacturer name, camera model number and firmware versions are optional. The 16 byte of encrypted data is the camera's serial number scrambled with the key K1, which is essentially the encrypted version thereof.

Next, at step 146, the card 42 performs a number of tasks. It processes the 16 bytes of encrypted data received from the camera 46, i.e. data 1, and processes the encrypted data residing in the card's AM area, i.e. data 1, and compares data 1 and data 2.

Next at 148, if data 1 is determined to be equal to data 2, the process continues to 152 to note an active, functional mode because the same camera that is expected to be operational with the same card is determined. Yet, if at 148, data 1 is not determined to be equal to data 2, the process continues to step 150 where it is determined that authentication is missed and the card 42 goes into an inactive mode. The camera 46 checks the card's status register to display proper error message(s).

Figure 12:
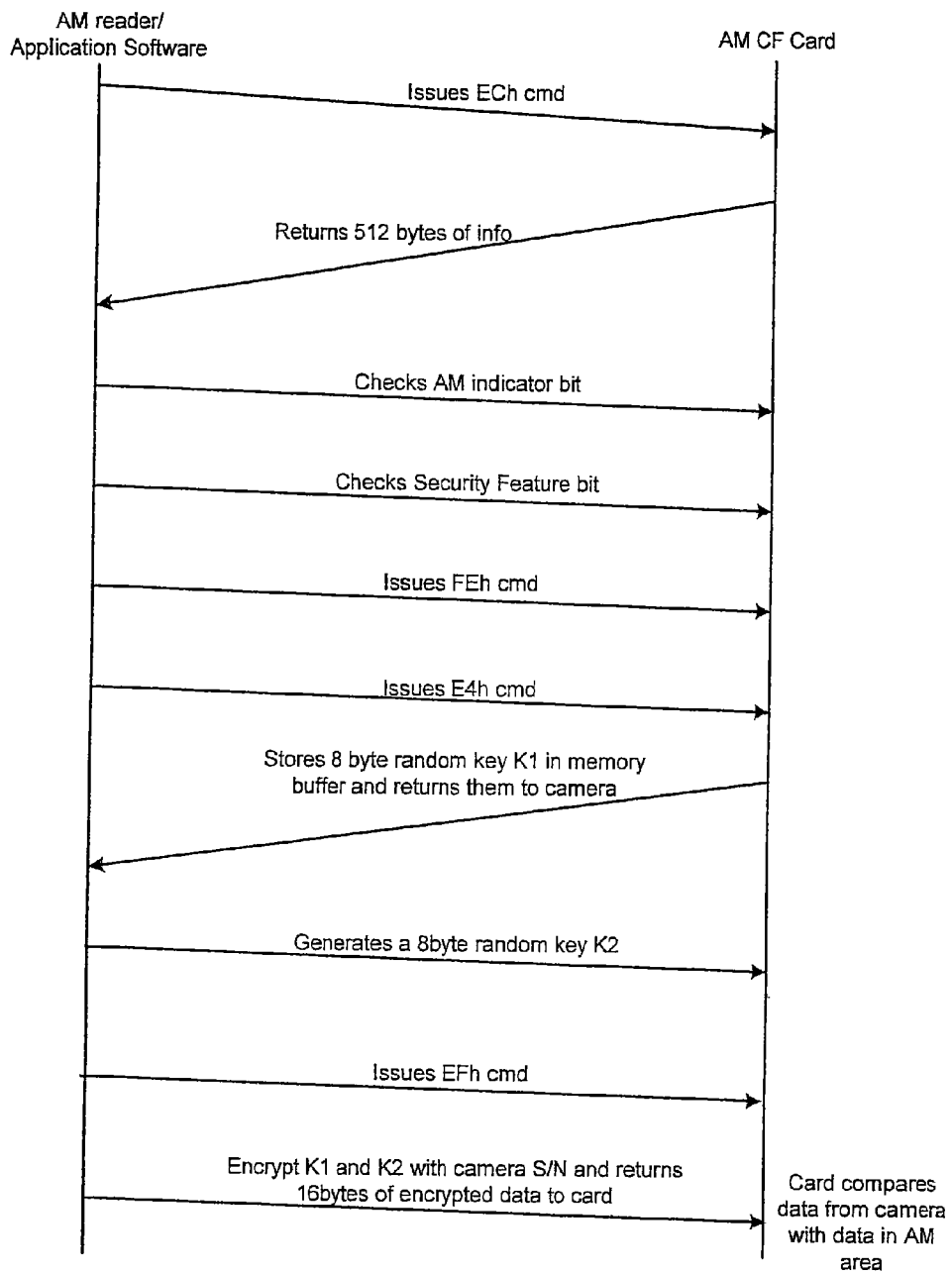
FIG. 12 depicts Level 2 security commands in conceptual form.

Level 2 security commands are depicted, in conceptual form, in FIG. 12. First, an EC command is issued from the camera 46 to the card 42. Next, a 512 byte information is returned by the card 42 to the camera 46. Thereafter, the AM indicator bit is checked and the security feature bit is checked by the card 42 and a FE command is issued, followed by an E4 command. Next, the card 42 causes storage of an 8-byte random key, K1, in the memory buffer of the card 42's controller and returns this key to the camera 46. The reader 44 generates an 8-byte random key, K2, and issues an EF command and encrypts K1 and K2 with the camera 46's serial number and returns 16 bytes of encrypted data to the card 42.

The card 42 compares the data from the camera 46 with the data in the AM area of the card 42.

Figure 13I:
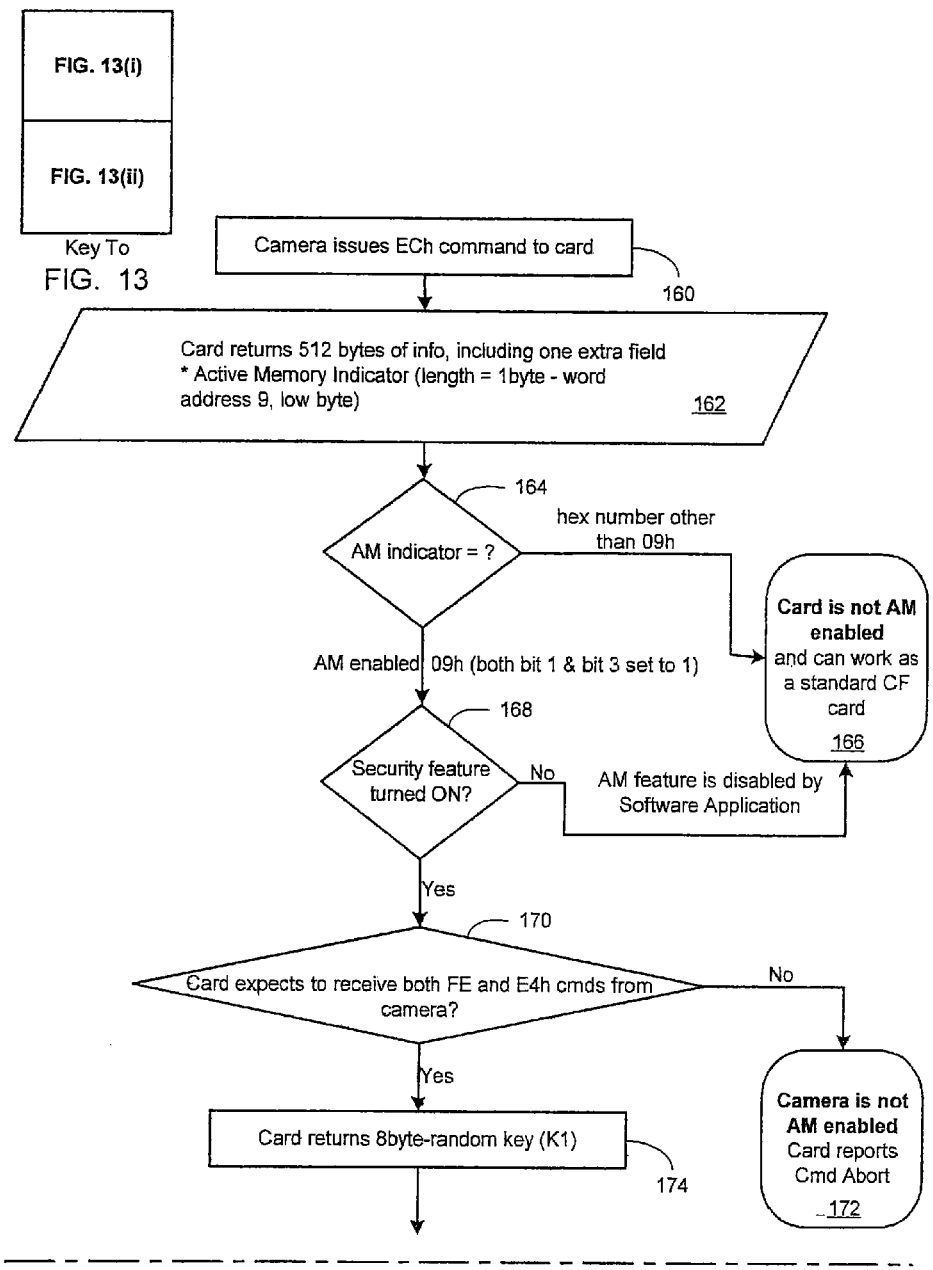
FIG. 13(i) is a flow chart that shows the process for level 2 security.
Figure 13:
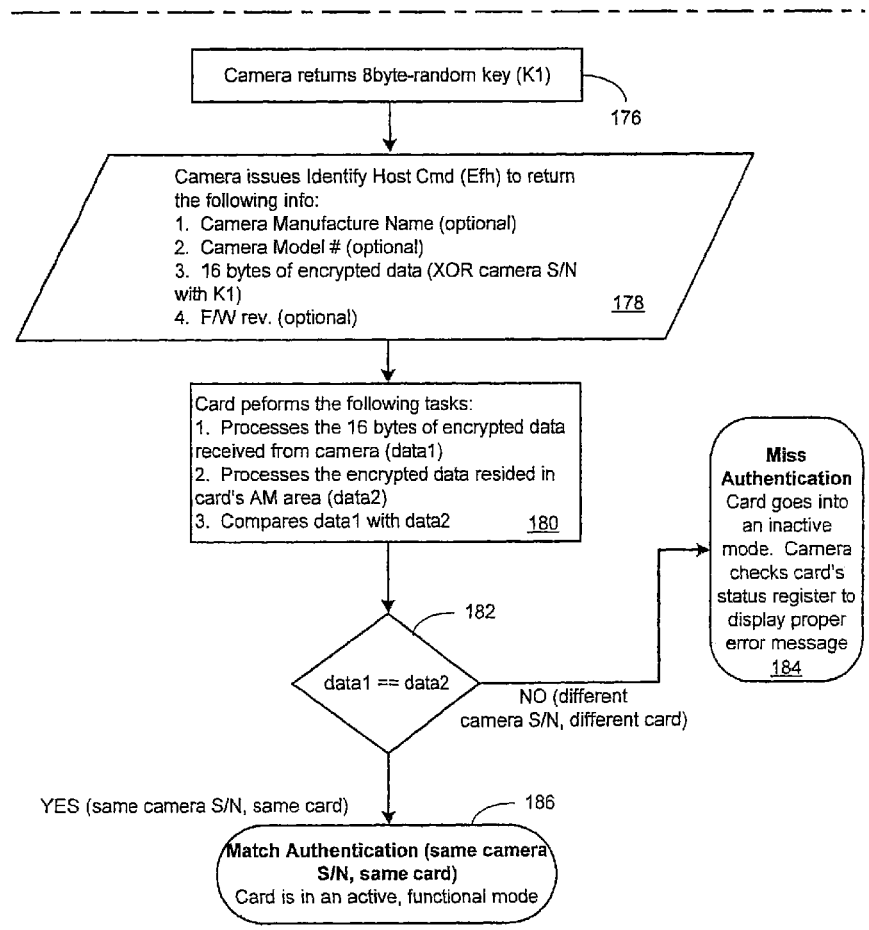
FIG. 13(ii) is a continuation of the flow chart of FIG. 13(i) that shows the process for level 2 security.

In FIG. 13, the process for level 2 security is shown in flow chart form. At step 160, the camera 46 issues an EC command to the card 42. Next, at step 162, the card returns 512 bytes of information, including one extra field. The extra field is discussed hereinabove. Next, at 164, it is determined whether or not the AM indicator is on. If it is determined to be on, the process continues to step 168, otherwise, the process continues to step 166 with the card 42 not being AM enabled and the card 42 operates as a standard card.

At 168, it is determined if the security feature is on and if so, the process continues to 170, otherwise, the process continues to step 166 at which time the camera is not AM enabled and the card 42 operates as a standard card. At 170, it is determined whether or not the card 42 expects to receive the FE and E4 commands from the camera 46. If so, the process continues to step 174 and if not, the camera 46 is not AM enabled at step 172 and the card 42 reports a command abort. At step 174, the card 42 returns an 8-byte random key, K1, and next, at step 176, the camera 46 returns an 8-byte random key, K2. Thereafter, at step 178, the camera 46 issues an Identify Host Command, EF, to return the following information: Camera Manufacture Name, Camera Model Number, 16 bytes of encrypted data; and Firmware version. This is similar to that of step 144 in FIG. 11 and the same options apply.

Next, at step 180, the card performs a number of tasks such as processing the 16 bytes of encrypted data received from the camera 46, i.e. data 1, and processing the encrypted data residing in the card's AM area, i.e. data 2, and comparing data 1 and data 2. This is similar to step 146 of FIG. 11. Next, in FIG. 13, if data 1 is determined to be equal to data 2, the right camera is noted to be operational with the right card, at step 186, and the card 42 is in an active, functional mode. However, if at 182, data 1 is not determined to be equal to data 2, the authentication is considered unsuccessful and at step 184, the card goes into an inactive mode. The camera 46 checks the card's status register to display proper error message.

At 170, it is determined whether or not the card 42 expects to receive the FE and the E4 commands from the camera 46. If so, the process continues to step 174 and if not, the process continues to step 172 step 172 at which time the camera is not AM enabled and the card 42 reports a command abort, as explained earlier.

An example of Vendor Unique Commands, used to program the active memory of the card 42 is as follows:

Lexar CF-ATA Vendor Unique Command Description

This section defines the format of the Lexar Vendor Unique commands from the camera and CF card. Commands are issued to and from the CF card by loading the required registers in the command block with the supplied parameters and then writing the command code to the Command Register.

1. Set Security Feature Command Set Security Feature Cmd Protocol Task File Register 7 6 5 4 3 2 1 0 COMMAND FEh DRIVE/HEAD Nu nu nu nu Options CYLINDER HI L CYLINDER LOW E SECTOR NUM X SECTOR COUNT A FEATURES R.

This command is used to set or clear the Security Feature Command.

Option—bits 0-3 are options supported:
00—No OP
01—Enable Security Mode check
This Cmd requires no data transfer.

2. Set or Clear or Verify Password Command Security Option Cmd Protocol Task File Register 7 6 5 4 3 2 1 0 COMMAND FCh DRIVE/HEAD Nu nu nu nu Options CYLINDER HI Option Length CYLINDER LOW Option Length SECTOR NUM Option Length SECTOR COUNT Option Length FEATURES Option Length.

This command is used to set or clear or verify password when AM card is being configured in reader. This command will send 512 bytes of data to card and requires a successful execution of the FEh command.

Bits 0-3 are options supported
00—No OP
01—Set password
02—Clear password
03—Verify password
04—Verify S/N
05—Add S/N
06—Force erase Option length—In case of setting or clearing or verifying password options (01, 02, 03) this field specifies password length (in bytes up to 16 bytes). In case of password change, this field includes the total password lengths of old and new passwords.

Follow set, clear, verify is 512 bytes of data. In case of new password, it contains the new password. In case of password change, it contains old password followed by new password.

Option Length—In case of adding or verifying S/N (option 4, 6) this field specifies the length of S/N in bytes. Follow add S/N is 512 bytes of data, it contains the S/N.

3. Read Buffer Command Read Buffer Cmd Protocol Task File Register 7 6 5 4 3 2 1 0 COMMAND E4h DRIVE/HEAD Nu nu nu nu Nu CYLINDER HI AA CYLINDER LOW BB SECTOR NUM 1 SECTOR COUNT 4 FEATURES Nu.

This command enables the camera to read the current contents of the CF's sector buffer. This command has the same protocol as the Read Sector(s) command and requires a successful execution of the FEh command.

4. Identify Host Command Indentify Host Cmd (Lexar Vendor Unique Cmd) Protocol Task File Register 7 6 5 4 3 2 1 0 COMMAND EFh DRIVE/HEAD Nu nu nu nu Nu CYLINDER HI L CYLINDER LOW E SECTOR NUM X SECTOR COUNT A FEATURES R.

This command enables the AM CF card to receive parameter information from the camera, returning 512 bytes of data.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A memory system, comprising:
a controller; and
memory coupled to the controller;
wherein the memory comprises an area configured to store encrypted first data only when the memory system comprises a security feature that is turned on and stores a status indicator having an expected value;
wherein the memory system is configured to grant access to the area in response to second data matching the first data;
wherein the first data comprises a password and a serial number of a device with which the memory system is configured for use; and
wherein the memory system is configured to go into an inactive mode in response to the second data not matching the first data.

2. The memory system of claim 1, wherein the memory system being configured to grant access to the area in response to the second data matching the first data comprises the memory system being configured to grant access to other data stored in the area in response to the second data matching the first data.

3. The memory system of claim 1, wherein the memory system is configured to decrypt the first data and the second data and to compare the decrypted first data to the decrypted second data.

4. The memory system of claim 1, wherein the memory system is configured to store a key in a location that is known only to a device with which the memory system is configured for use.

5. The memory system of claim 1, wherein the memory system is configured to indicate an error in response to the second data not matching the first data.

6. The memory system of claim 1, wherein the memory system is further configured determine that the memory system is authenticated to a device, coupled to the memory system, in response to the second data matching the first data.

7. The memory system of claim 1, wherein the memory system is further configured determine that the memory system is authenticated to a reader, coupled to the memory system, in response to the second data matching the first data.

8. The memory system of claim 1, wherein the memory system is configured to compare the first data to the second data.

9. A memory system comprising:
a controller; and
memory coupled to the controller;
wherein the memory comprises an area configured to store encrypted first data;
wherein the memory system is configured to grant access to the area in response to second data matching the first data;
wherein the first data comprises a password and a serial number;
wherein the serial number is a serial number of a device that is coupled to the memory system and into which the memory system is inserted; and
wherein the memory system is configured to go into an inactive mode in response to the second data not matching the first data.

10. The memory system of claim 9, wherein the memory is configured to store a key in a location known only to the device that is coupled to the memory system and into which the memory system is inserted.

11. A method of operating a memory system, comprising:
granting access to an area of memory of the memory system in response to a controller of the memory system determining that second data matches first data, wherein the area of memory of the memory system stores the first data in encrypted form;
placing the memory system in an inactive mode in response to the controller of the memory system determining that the second data does not match the first data;
wherein the first data comprises a password and a serial number of a device coupled to the memory system.

12. The method of claim 11, wherein granting access to the area of memory of the memory system in response to the controller of the memory system determining that the second data matches the first data comprises granting access to other data in the area of memory of the memory system in response to the controller of the memory system determining that the second data matches the first data.

13. The method of claim 11, further comprising decrypting the first data and the second data.

14. The method of claim 11, further comprising outputting information that indicates that the area of the memory of the memory device is configured to store the first data in encrypted form.

15. The method of claim 11, further comprising determining that the device coupled to the memory system is a correct device in response to the controller of the memory system determining that the second data matches the first data.

16. The method of claim 11, further comprising determining that the memory system is coupled to a correct reader in response to the controller of the memory system determining that the second data matches the first data.

17. The method of claim 11, wherein the first data in encrypted form stored in the area of memory of the memory system is encrypted first data, and further comprising, before the controller determines that second data matches first data:
   receiving the second data as encrypted second data from the device coupled to the memory system;
   processing the encrypted second data using the controller; and
   processing the encrypted first data using the controller.

\* \* \* \* \*